Aug. 16, 1955  S. B. PICKLES  2,715,727
OMNIDIRECTIONAL RADIO RANGE SYSTEM
Filed March 14, 1951  2 Sheets-Sheet 1
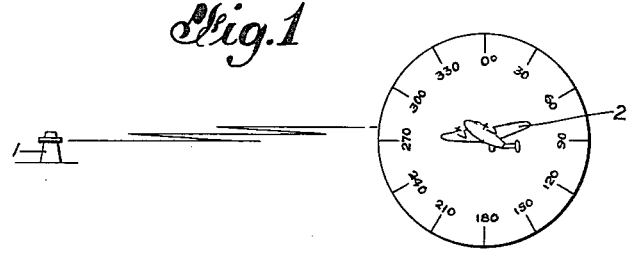
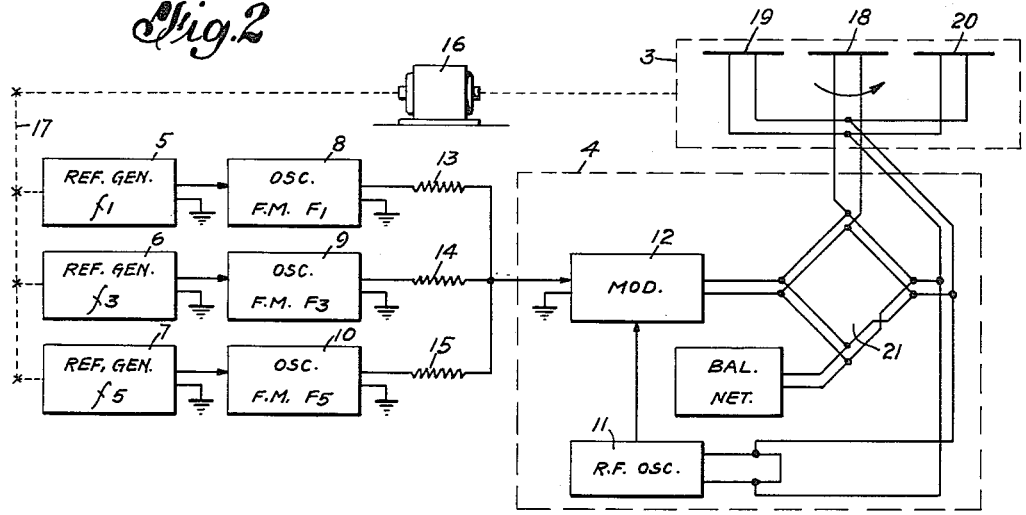
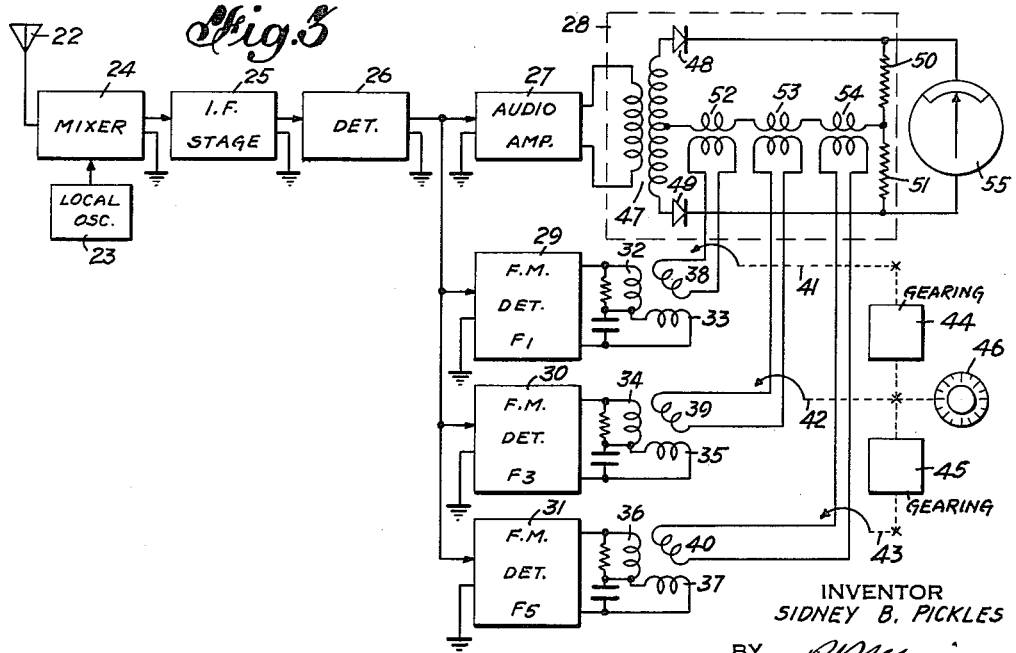
INVENTOR
SIDNEY B. PICKLES
BY
ATTORNEY Aug. 16, 1955 S. B. PICKLES 2,715,727
OMNIDIRECTIONAL RADIO RANGE SYSTEM
Filed March 14, 1951 2 Sheets-Sheet 2
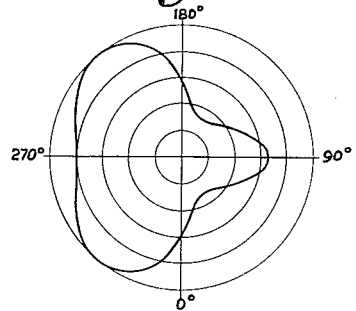
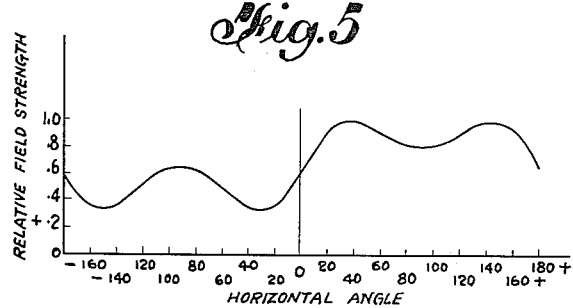
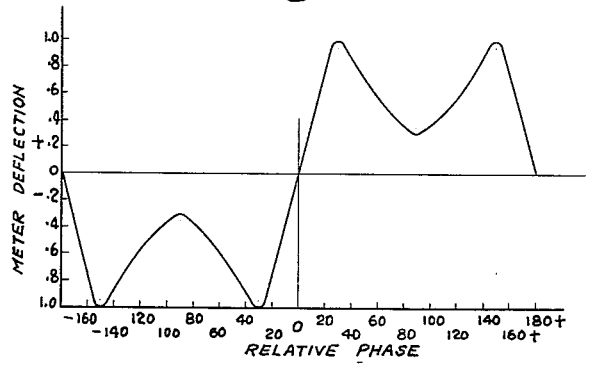
INVENTOR
SIDNEY B. PICKLES
BY
ATTORNEY United States Patent Office 2,715,727
Patented Aug. 16, 1955

2,715,727

OMNIDIRECTIONAL RADIO RANGE SYSTEM

Sidney B. Pickles, Tarrytown, N. Y., assignor to International Telephone and Telegraph Corporation, a corporation of Maryland Application March 14, 1951, Serial No. 215,537

10 Claims. (Cl. 343—106)

This invention relates to omni-directional radio range systems and more particularly to radio range systems of the phase comparison type.

Omnidirectional radio beacon systems provide a guiding line in all directions, and so are more flexible than the fixed course beacons. One type of omni-directional range beacon generally favored is the so called phase-comparison type. In this system a directive radio pattern is rotated at a given rate, so that at a fixed receiving point an amplitude variation is produced having a fundamental frequency component determined by the rate of rotation. The wave produced by this rotation may be referred to as the envelope wave or bearing information wave. A reference signal wave is also transmitted as a modulation component of a frequency corresponding in frequency with said envelope wave and fixed in phase. As is clear the envelope wave will have a phase relation with respect to the reference wave dependent upon the angular position of the observation point with respect to the point of origin of the beacon radiation. The waves are so related that in a predetermined azimuth, for example, north, the envelope wave and reference wave are cophasal. Thus the bearing of a craft with respect to the beacon can readily be obtained by making a phase comparison of these two waves.

In systems using the longer wave lengths electronic rotation of the bearing pattern is generally used as the structure is too large to rotate at a speed to provide a practical envelope frequency. At the higher frequencies, for example, at a thousand megacycles physical rotation is feasable. This is desirable as it avoids quadrantal and octantal errors which occur in phase rotating systems.

In comparing a sine wave of rotation frequency with a corresponding reference wave, the difference in phase varies quite slowly over portions of the angular range giving low sensitivity, and thus rendering the system subject to deviation errors from reflected energy in these portions. To remedy this, auxiliary means are provided to give the pattern harmonic distortions.

In the interests of radiation pattern efficiency the principal antennas are generally spaced to provide a minimum or complete absence of harmonic frequencies in the envelope waves, any desired harmonic distortion being provided by added units. Thus the pattern used is generally of cardiodal form having a single minimum. Accordingly there is considerable mutual coupling between the antennas with a consequent development of undesired vertically polarized energy from normal horizontally polarized antennas. This fact also tends to reduce sharpness of the courses defined by the beacon.

It is an object of this invention to provide an omni-directional radio beacon transmitter and/or receiver of the phase comparison type which will mitigate against the above disadvantages by use of an antenna of spaced omni-directional units, producing wave components harmonically related to the envelope and reference wave fundamental components, and/or receivers particularly adapted for use in the system.

According to a feature of my invention a directive rotating pattern, distorted from the normal cordiodal pattern is produced by means of a central radiator and two spaced radiators spaced and energized to provide odd frequency components in the received waves. The components are compared in phase at a receiving point producing a sharpened course indication and one less subject to deviation from reflections of signals.

The distortion of the pattern may be accomplished by making a relatively wide spacing of the antennas, but less than one wave length separation is made to avoid complete nulls in the pattern. Also the harmonic components are maintained at a level below the fundamental waves to avoid course ambiguities that otherwise may occur. The wider spacing also reduces mutual coupling of the antennas reducing the unwanted polarization signal energy. At the receiver the complex envelope wave is compared in phase with the separate reference wave components to produce a resultant meter indication.

The reference wave generators are all controlled in synchronism with the antenna rotation so that the components will be in phase with the envelope wave components. The separately generated reference waves are each modulated on to separate sub-carrier waves, preferably by frequency modulation, after which the radio frequency carrier is amplitude modulated with the modulated sub-carriers. At the receiver the transmitted signal is detected and the complex envelope wave is applied to a phase detector in one sense. The reference signal waves, obtained by separating and demodulating the sub-carriers, are applied to the phase detector in another sense. The reference wave signals are applied to the indicator in another sense after separation and demodulation of the separated sub-carriers. Preferably the separate sub-carriers are amplitude limited before frequency demodulation to avoid any amplitude modulation effects from the pattern rotation.

The above-mentioned and other features and objects of this invention will become more apparent, and the invention itself will be best understood by reference to the following description of an embodiment of the invention taken in conjuction with the accompanying drawings, in which:

Fig. 1 is a schematic representation of a radio range;

Fig. 2 is a diagram in block form illustrating a circuit arrangement of the transmitter of a radio range, in accordance with the invention;

Fig. 3 is a diagram in block form of a receiver for the range;

Fig. 4 is a graphical representation of typical radiation pattern for a range in accordance with the present invention;

Fig. 5 is a representation in graphical form of the complex audio signal at the detector of the receiver shown in Fig. 3;

Fig. 6 is a graphical representation of the course indicated by the meter with varying phase.

Referring now to Fig. 1 the omni-directional range generally comprises a transmitting station symbolically represented by an antenna tower shown at 1, which sends out a predetermined radiation pattern, preferably in a form shown in Fig. 5, in an omni-directional sense due to rotation thereof, produced by physical rotation of the antenna, or by a continuous change in phase. This radiation pattern is picked up by an observer such as provided on an aircraft in flight shown at 2.

For a better understanding of the detailed working of the system, reference is now had to the block diagram of the transmitter shown in Fig. 2.

The transmitter of Fig. 2 comprises an antenna system 3 to which is supplied from a transmitter 4 a typical carrier frequency, for instance at 1000 mc. The transmitter frequency is modulated, in the example shown by reference signals, provided by reference signal generators 5 and 6, and 7, providing reference frequencies $f1$, $f3$ and $f5$, of 90, 270 and 450 cycle waves, for example, which are utilized for frequency modualting sub-carrier waves F1, F3 and F5 respectively. These may be 100, 120 and 140 kc. waves provided by oscillator modulators 8, 9 and 10 respectively. The frequency modulated sub-carriers thus provide the reference signal information, which will be transmitted to all receivers regardless of their locations in space. Finally, the signals from the modulators 8, 9 and 10 are applied to amplitude-modulate the transmitted carrier energy from oscillator 11 in modulator 12, over isolating resistors 13, 14 and 15 resulting in a radiation pattern having a complex envelope wave comprising a plurality of lobes of uneven intensity, as shown in Fig. 4, due to the amplitude modulation of the carrier energy.

In order to obtain the rotation of the pattern, the antenna system 3, in this case, has been shown mechanically rotated by a synchronous motor 16, which through mechanical linkage 17 also drives the reference signal generators 5, 6 and 7. The motor 16 may drive the antenna assembly at a speed of rotation of 5400 R. P. M. and produce a 90 cycle per second signal in the generator 5, thus providing a completely synchronized performance.

The directive antenna 3 may comprise several antenna units as shown including a central unit 18, and a pair of units 19 and 20 on opposite sides thereof. Units 19 and 20 are energized directly with energy from oscillator 11, and produce the principal rotating directive pattern, in co-operation with the center unit 18. Only the outer units need be rotated as the center of rotation is at the center of unit 18. The units 18, 19 and 20 may be of the so-called Alford loop type and produce radiation of horizontal polarization. The center antennas unit is supplied with radio frequency energy modulated with the sub-carrier energies having reference signal components modulations. The feed may be made over a transmission line bridge network 21 as shown. The spacing of the units and the relative amplitude of energy supplied is such as to provide a radiation pattern having a plurality of lobes of uneven intensity. The multilobe radiation pattern is rotated, as heretofore explained producing at a receiver point a complex envelope wave composed of signals at the reference frequencies and having amplitude variations due to the rotation of the radiated multilobe pattern.

In a preferred embodiment the outer units are spaced at 165 electrical degrees from the center units and are energized in phase opposition. The energy supplied to the outer antenna units is maintained small with respect to that fed the central antenna unit, for example, at 25 thereof to prevent deep nulls in the pattern.

The receiver circuit, Fig. 3 as provided on an observer aircraft, preferably includes a receiving antenna 22 and the usual frequency converter circuit comprising a local oscillator 23 and a mixer 24 which feed into an intermediate frequency stage 25. A detector or demodulator 26 supplied from the intermediate frequency stage 25 provides an audio signal containing amplitude variations due to the rotation of the transmitter antenna pattern for the purpose of supplying bearing information and also the three reference signal sub-carriers, each carrying as frequency modulation one of the components of the reference signal. These components of the detector output are now separated, the signal due to the transmitter antenna rotation being amplified in the audio amplifier 27 and thence fed to phase comparison circuit 28. The sub-carriers, in turn, are separated by filter amplifier detector circuits 29, 30 and 31 which also each include a limiter stage, and are demodulated into the reference signal frequency components $f1$, $f3$ and $f5$.

Each of these components is applied to energize the stator windings 32, 33; 34, 35; 36, 37 at 90° phase displacement respectively of the azimuth selector associated with it. Each of the sets of stator coils 32—37 are associated with respective rotor coils 38, 39 and 40 respectively which, in turn, are coupled with phase comparator 28. The separate rotors 38—40 are coupled together with mechanical linkage 41, 42, 43 and gearing mechanisms 44, 45 to a manually adjustable knob 46. Mechanisms 44 and 45 are so chosen that rotors 39 and 40 will turn three and five times, respectively, for each single revolution of rotor 38 to maintain the proper phase of the fundamental and harmonic components of the reference wave energy. Knob 46 is adjusted to provide the desired phase relation between the reference wave and the envelope wave in comparator 28 for a desired course.

Comparator 28 may comprise an input transformer 47 for the envelope wave, the secondary of which is coupled through rectifiers 48 and 49 to output load resistors 50 and 51. Between the mid-point of the secondary transformer 47 and the junction of resistors 50 and 51 are connected to the transformers 52, 53 and 54 which serve to apply the reference signal energy to the comparator. An output meter 55 is coupled across load resistors 50 and 51 to indicate the phase relation and hence the alignment of the receiver with any desired course. The course sharpness is increased by the comparison of the present harmonics present in the envelope voltage and the reference signal harmonics energies applied through transformers 53 and 54, while the comparison of the fundamental frequency waves reduces ambiguity of the course signals. In use knob 46 may be adjusted to have meter 55 read zero, so that departures from course will be indicated by deflection of the pointer to one side or the other.

Fig. 4 shows a typical radiation pattern as produced by the three antenna units 18, 19 and 20, Fig. 2, in a practical system. With an antenna spacing of 165 electrical degrees the radiation pattern may be expressed as follows:

$$F(\theta) = 1 - .1 \cos(165° \sin \theta) + .5 \sin(165° \sin \theta)$$

(where $\theta$ is the azimuth for the horizontal pattern).

The rotation of this pattern will produce a resultant complex audio signal at the output of the detector 26, Fig. 3 (somewhat in accordance with the curve shown in Fig. 5). The resultant bearing signal has the following expression:

$$F(\theta) = .342 + .257 \sin Wt + .192 \sin 3Wt + .020 \sin 5Wt - .067 \cos 2Wt - .017 \cos 4Wt$$

(where $\theta$ is the angle of rotation, i. e. the bearing angle and $Wt$ is the expression for radius with time).

It will be seen that this curve not only contains the fundamental frequency corresponding to the speed of rotation of the transmitter array (i. e. $Wt$) but also appreciable harmonics up to the 5th. The phase of these harmonics, with respect to their non-directionally transmitted counter-parts, can be measured as accurately as the fundamental, since the electrical degrees of the harmonics represent proportionally smaller arcs of the bearing about the station.

The graph shown in Fig. 6 represents the plot of the deflection of the meter 55 as a function of the bearing angle for the fundamental and third harmonic. It will be seen that the deviation of the meter about the zero point is very rapid up to about 30°. Beyond that point, the deflection is progressively less up to an angle of approximately 90°. From 90° to 150°, the deflection increases somewhat, and beyond 150° the deflection decreases to the position corresponding to on-course to 180°. Thus near zero, representing the desired course line to the beacon, the deflection increases sharply to the right or left for corresponding deviations from the course line up to about 30° Beyond this point the pointer deviation will decrease, and again increase slowly, but never drop to zero up to the 150° point. Beyond this point the deflection decreases rapidly to zero again at 180°. This second zero indicates a crossing of the course line on the opposite side of the beacon from the desired course.

While I have described above the principles of my invention in connection with specific apparatus, it is to be clearly understood that this description is made only by way of example and not as a limitation to the scope of my invention as set forth in the objects thereof.

What I claim is:

1. A radio beacon system comprising a directive antenna including a central radiator and a pair of radiators spaced from said central radiator, means to produce effective rotation of said spaced radiators about said central radiator whereby radiation at a fixed position with respect to said antenna will vary with a fundamental frequency dependent upon the rotation speed, said radiators being spaced to produce a directive pattern whereby at least one bearing signal harmonic frequency of said fundamental frequency will result, a source of radio frequency energy coupled to said outer radiators, a source of reference frequency energy synchronized with rotation of said antenna for producing reference frequency energy at said fundamental frequency and harmonic frequency, a modulator for modulating said reference frequency energy upon said radio frequency energy, and means for applying modulated energy from said modulator to said central radiator.

2. A radio beacon system according to claim 1, wherein said modulator is a frequency modulator.

3. A radio beacon system according to claim 1 wherein said reference source comprises separate harmonically related reference frequency generators.

4. A system according to claim 1, wherein said source of reference frequency comprises separate subcarrier generators, and said modulator comprises means for modulating energy from said generators with energy from respective of said generators and means for modulating said radio frequency.

5. A system according to claim 4, further comprising a receiver for receiving energy from said radiators, means for separating said bearing signal frequency energies and said sub-carriers from the received energy, detector means for detecting said separated sub-carriers to derive said reference frequency energies, and comparator means for comparing the phase of said bearing frequency energies and said detected reference frequencies to provide direction indications.

6. A system according to claim 5 further comprising a zero center meter on the output of said comparator means, and adjustable phase shifters between said detector means and said comparator to adjust to zero indications on said meter for a predetermined direction line to said beacon.

7. A system according to claim 1, further comprising a receiver for receiving energy from said radiators, means for seperating said bearing signal frequency and harmonic frequency energy from the received energy, means for detecting said reference frequency energies, and means for comparing the phase of said bearing signals and said detected reference frequency energies to provide direction indications.

8. A system according to claim 7 further comprising a zero center meter in the output of said means for comparing, and adjustable phase shifters between said means for detecting and said means for comparing, whereby the phase of said reference frequency energies may be adjusted for zero indication on said meter for a predetermined direction line toward said beacon.

9. A direction indicating receiver for indicating the direction line from a receiving point to a beacon by means of received energy, which energy contains a bearing signal of a phase determined by the position of the craft with respect to the beacon composed of a fundamental frequency and harmonic frequency components, and separable sub-carrier frequencies modulated with reference signal energies of fixed phase and of said fundamental and harmonic frequencies, comprising a detecting receiver for receiving and detecting said energy, filters for separating said bearing signals, and said sub-carriers, detectors for detecting said separated sub-carriers to derive said reference frequency energies, and a comparator for comparing the phase of said bearing frequency energies and said reference frequency energies to provide direction indications.

10. A direction indicating receiver according to claim 9 further comprising a zero center meter on the output of said comparator means, and adjustable phase shifters between said detector means and said comparator to adjust to zero indications on said meter for a predetermined direction line to said beacon.

References Cited in the file of this patent

UNITED STATES PATENTS

| | | |
|---|---|---|
| 2,252,699 | Byrne | Aug. 19, 1941 |
| 2,422,110 | Luck | June 10, 1947 |
| 2,513,493 | Kliever | July 4, 1950 |
| 2,551,828 | De Fremery | May 8, 1951 |